United States Patent
Reese

(10) Patent No.: US 8,200,678 B2
(45) Date of Patent: *Jun. 12, 2012

(54) PRESENTING CONTENT BUILT AROUND WORD PHRASES SELECTED FOR PROFITABILITY

(75) Inventor: Byron William Reese, Georgetown, TX (US)

(73) Assignee: Demand Media, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,212

(22) Filed: Jul. 20, 2011

(65) Prior Publication Data

US 2011/0276574 A1    Nov. 10, 2011

Related U.S. Application Data

(63) Continuation of application No. 12/337,550, filed on Dec. 17, 2008, now Pat. No. 8,001,131.

(51) Int. Cl.
*G06F 17/30* (2006.01)

(52) U.S. Cl. ....... 707/750; 705/7.29; 705/14.4; 705/400
(58) Field of Classification Search .................. 707/750; 705/7.29, 14.4, 400; 345/163
See application file for complete search history.

(56) References Cited

U.S. PATENT DOCUMENTS

| | | | |
|---|---|---|---|
| 7,454,409 B2 * | 11/2008 | Roy et al. .............................. | 1/1 |
| 8,001,131 B2 * | 8/2011 | Reese ........... | 707/750 |
| 2006/0242013 A1 * | 10/2006 | Agarwal et al. .................. | 705/14 |
| 2009/0037421 A1 * | 2/2009 | Gamble ......................... | 707/10 |
| 2010/0138421 A1 | 6/2010 | Oldham et al. | |
| 2010/0153391 A1 | 6/2010 | Reese | |

* cited by examiner

*Primary Examiner* — Cheryl Lewis
(74) *Attorney, Agent, or Firm* — Greenberg Traurig, LLP

(57) ABSTRACT

A computing device receives, over a network, information regarding word phrases (e.g., search terms) and determines longevity values associated with content built around the word phrases. The computing device selects, based on the longevity values, a first phrase from the word phrases. Content is built or created around the first phrase, and the built or created content is presented or published over a network such as the Internet.

20 Claims, 4 Drawing Sheets

PRESENTING CONTENT BUILT AROUND WORD PHRASES SELECTED FOR PROFITABILITY

CROSS-REFERENCE TO RELATED APPLICATIONS

The present application is a continuation of U.S. Non-Provisional Application Ser. No. 12/337,550 U.S. Pat. No. 8,001,131, filed Dec. 17, 2008, entitled "METHOD AND SYSTEM FOR RANKING OF KEYWORDS FOR PROFITABILITY," by Byron William Reese, the entire contents of which application is incorporated by reference as if fully set forth herein.

FIELD OF THE INVENTION

The present application relates to a method for selecting words (e.g., word phrases such as Internet search terms or keywords) for use based on profitability.

BACKGROUND

Internet-based advertising is now a common means of advertising. There are several basic steps involved:
1. Advertisers bid on keywords. The factors affecting the price of the keywords differ depending on the search engine.
2. Some websites set aside space for ads to be placed. In this advertising model, the website owners cannot choose which ads will fill the space. They have an agreement with search engines to allow search engines to place ads in the allotted space which are closely aligned with the website's content.
3. Advertisers only pay when a web user clicks on the advertisement.
4. Search engines collect this "click-thru" fee and share a portion with the website which hosted the ad.
5. Advertisements placed on websites which are closely related to the ad's subject have higher click-thru rates. Therefore, a high degree of relatedness of the advertisement to the website is advantageous to all parties because:
   a. The advertiser gets more targeted exposure;
   b. The websites receive payment for bringing traffic to the advertiser;
   c. The search engine receives payment for facilitating the arrangement.

SUMMARY

In one embodiment of the present invention, a computer implemented method provides a profitability ranking for a search term. A physical computing device receives information regarding a total number of people who are searching on the search term. Information is received regarding an amount advertisers pay for the search term. Information is received regarding a click through rate of the search term. A traffic estimate of the search term is determined. Longevity of the search term is determined.

This data is then weighted and compiled to determine worth of the keyword.

In another embodiment, a machine-readable medium stores a set of instructions, which when executed on a computing device, cause the computing device to perform a method comprising: receiving, over a network, information regarding word phrases; determining, via a physical computing device, longevity values associated with content built around the word phrases; selecting, based on the longevity values, a first phrase from the word phrases; building first content around the first phrase; and presenting the first content over a network.

In one embodiment, a computer implemented method for ranking a search term by profitability comprises: receiving, via a physical computing device, information regarding a total number of people who are searching the search term; determining a traffic estimate of the search term; and determining longevity of the search term.

In one embodiment, a system determines profitability of a word phrase, and the system comprises: at least one physical computing device coupled to external database sources; a competitive ability module, coupled to the sources, to determine a traffic estimate of the word phrase; and a longevity module, coupled to the sources, to determine the longevity of the word phrase.

Many other features and embodiments of the present invention will be apparent from the accompanying drawings and from the following detailed description.

BRIEF DESCRIPTION OF THE DRAWINGS

The present disclosure is illustrated by way of example and not limited in the figures of the accompanying drawings in which like references indicate similar elements.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention involves a method and system for selectively considering data regarding various word phrases such as search terms, or keywords, to determine their profitability. In one embodiment, the present invention may be used in assessing the profitability of search terms in an advertising system for advertisements displayed over the Internet. In one embodiment, the present invention considers the following exemplary factors (1) the number of likely audience members for each search term, (2) the likely dollar amount advertisers will pay for each search term, (3) the likely click rate for each search term, (4) the ability of content targeting a given search term to compete with other content targeting that same term, and (5) the estimated longevity of content created relating to each search term.

Figure 1:
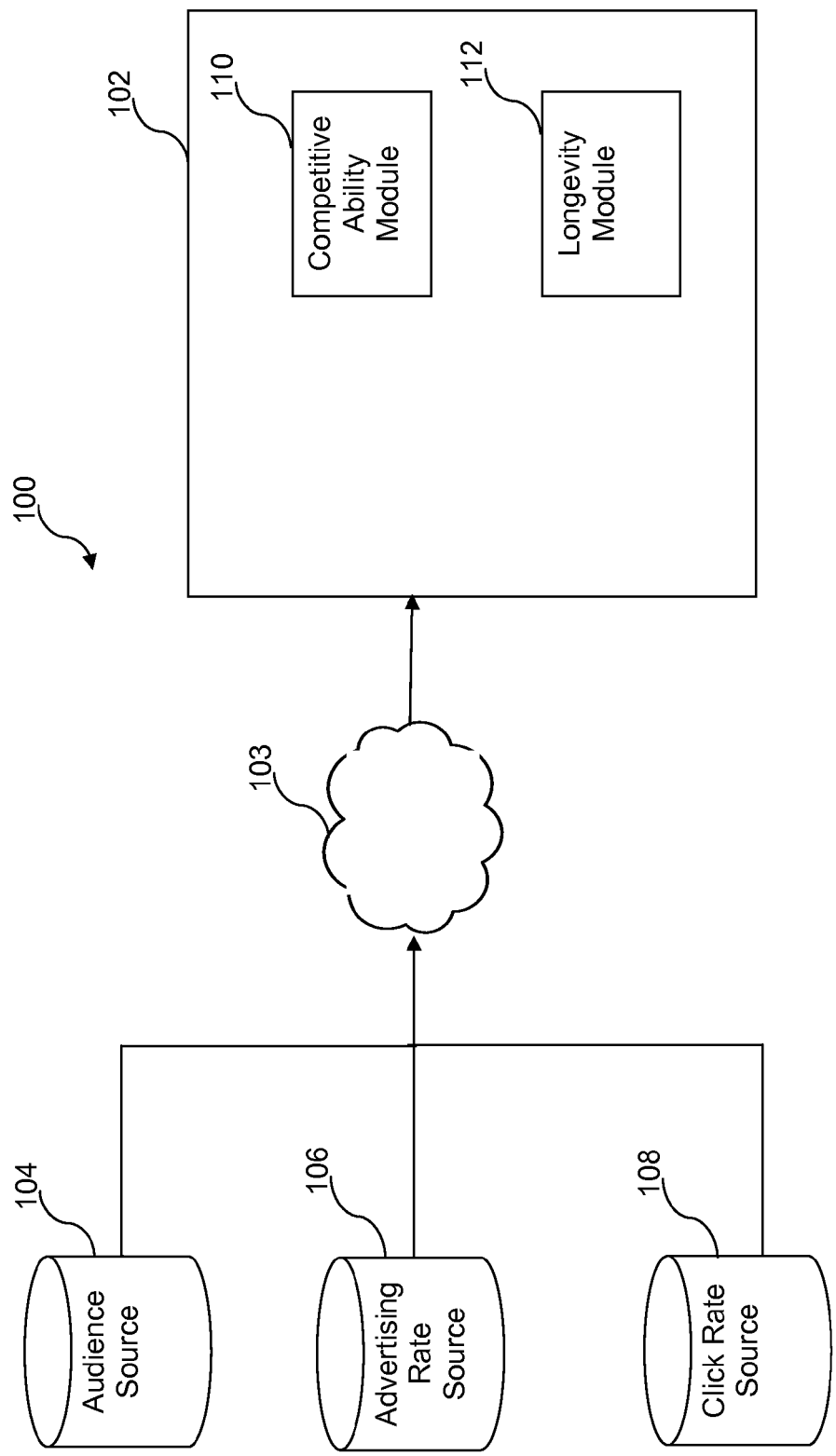
FIG. 1 illustrates a search term profitability system in accordance with one embodiment of the present invention.

As shown in FIG. 1, a system 100 in accordance with one embodiment of the present invention includes a computing device 102, audience source 104, advertising rate source 106, click rate source 108, a competitive ability module 110, and a longevity module 112. In one embodiment, the competitive ability module 110 and the longevity module 112 are integrated within the computing device 102. In one embodiment, components of the system 100 are distributed over the Internet 103. In another embodiment, components of the system 100 are maintained within an intranet of an organization. In yet another embodiment, the components of the system 100 are selectively distributed over the Internet as well as maintained within an intranet of an organization.

In one embodiment, one or more of the audience source 104, the advertising source 106, and the click rate source 108 may each constitute a plurality of smaller sources, or databases, that in the aggregate are represented by the audience source 104, the advertising source 106, and the click rate source 108. In one embodiment, one or more of the audience source 104, the advertising source 106, and the click rate source 108 may be coupled to other information sources or databases that provide data to populate the audience source 104, the advertiser source 106, and the click rate source 108. In one embodiment, the other information sources or databases may be managed or maintained by entities different from those managing the system 100 or components thereof.

The audience source 104 contains information from which to ascertain the total number of people who are searching on a particular search term (Audience Number) AU. The Audience Number AU can be determined from information obtained for a fee or for free from other sources, such as those maintained by companies offering search engines and other search services.

When various audience sources 104 provide or suggest, for a particular search term, different values for the Audience Number AU, the values are analyzed and combined to produce a net value for the Audience Number AU. In one embodiment, each value from the various audience sources 104 is reduced to a log value. The log values associated with the various audience sources 104 are then averaged. The averaged value is then converted to a base ten value. The base ten value constitutes the net value for the Audience Number AU. The net Audience Number AU can be validated by a high number of audience sources 104 having values that approximate or are consistent with the Audience Number AU. In one embodiment, the value of Audience Number AU is between 100 and 10,000,000. The AU may be mathematically manipulated in other fashions to achieve a relative weighting of the sources.

The advertising rate source 106 contains information from which to ascertain how much advertisers are paying for each search term (Advertising Rate) AR. Like the Audience Number AU, the Advertising Rate AR can be determined from information obtained for a fee or for free from other sources, such as those maintained by companies offering search engines and other search services.

Like the Audience Number AU, when various advertising rate sources 106 provide or suggest, for a certain search term, different values for the Advertising Rate AR, the values are analyzed and combined to produce a net value for the Advertising Rate AR. In one embodiment, each value from the various advertisers sources 106 is reduced to a log value. The log values associated with the various advertisers sources 106 are then averaged. The base ten value constitutes the net value of the Advertising Rate AR. The net Advertising Rate AR can be validated by a high number of advertising sources 106 having values that approximate or are consistent with the Advertising Rate AR. In one embodiment, the value of the Advertising Rate AR is between $0.05 and $50.00.

The Click-Thru rate source 108 contains information from which to ascertain how much advertisers are paying for each search term (Click-thru Rate) CTR. Based on the number of people who search a particular search term in a particular period of time, the Click-Thru Rate CTR indicates how many of those people clicked on or selected advertisements that appeared in connection with search results for the search term. As will be appreciated by those having ordinary skill in the art, various methodologies can be employed to determine click-thru metrics. The Click-Thru Rate CTR can be determined only through empirical data which records the number of searches relating to a specific term and the frequency with which those searchers click on advertising. In one embodiment, the value of the Click-Thru Rate CTR is between 0.1% to 40%.

Figure 2:
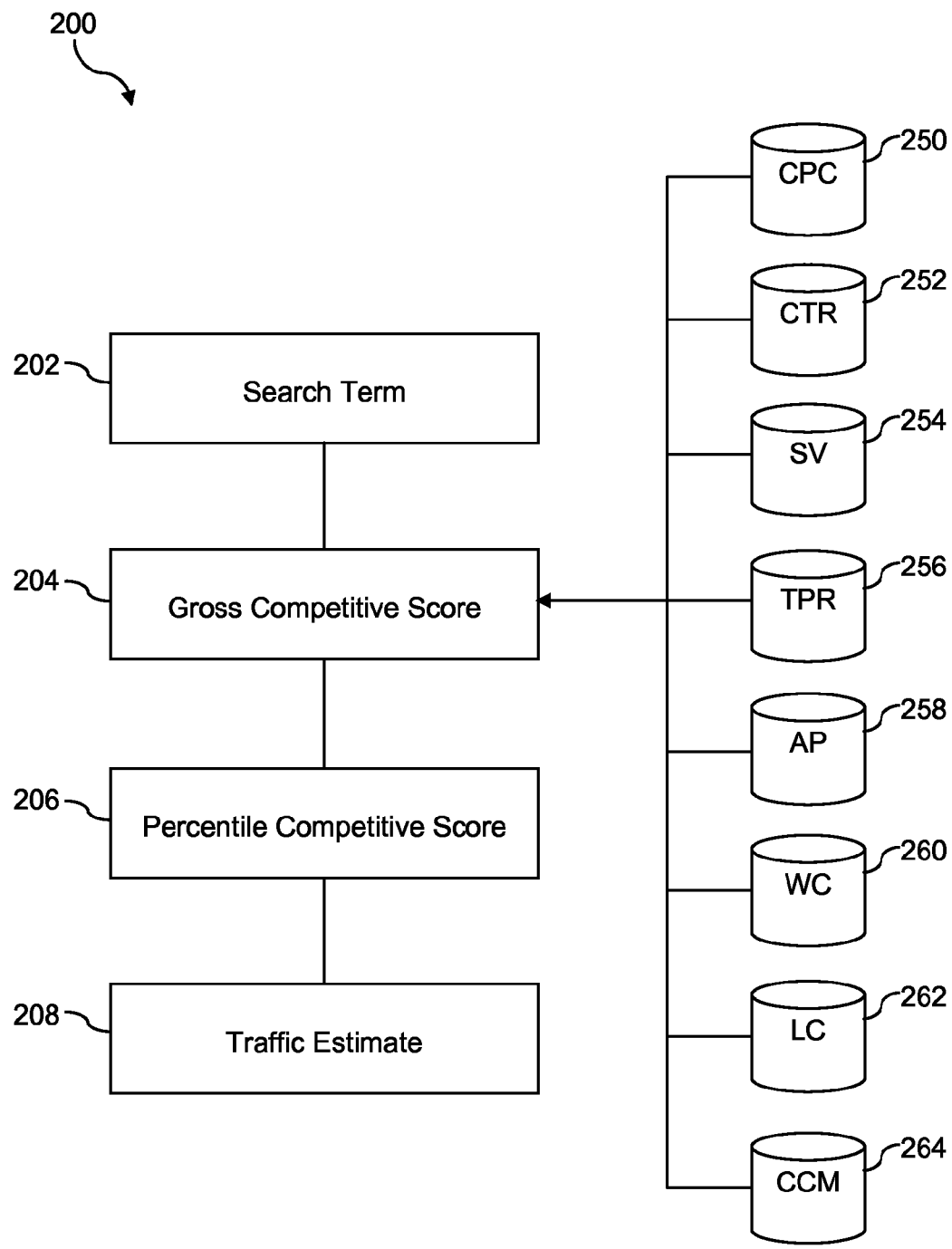
FIG. 2 illustrates a method for determining a traffic estimate in accordance with one embodiment of the present invention.

The competitive ability module 110 provides a value indicating a traffic estimate for a particular search term (Traffic Estimate) TE. In one embodiment, the competitive ability module 110 is integrated into the computing device 102. In one embodiment, the competitive ability module 110 provides the Traffic Estimate TE to the computing device 102. FIG. 2 illustrates a routine 200 to determine the Traffic Estimate TE. At block 202, a search term is designated for which a Traffic Estimate TE is desired. The routine 200 continues to block 204. At block 204, a Gross Competitive Score is determined based on information from a cost per click (CPC) source 250, a Click-Thru rate (CTR) source 252, a search volume (SV) source 254, a third party rating (TPR) source 256, an aggregate page rank (AP) source 258, a word count (WC) source 260, a letter count (LC) source 262, and a Category Competitiveness Measurement (CCM) 264. Each source provides a score value that is indicative of competitiveness of a search term and that is used in the determination of the Gross Competitive Score 264.

In one embodiment, some but not all of the cost per click (CPC) source 250, the Click-Thru rate (CTR) source 252, the search volume (SV) source 254, the third party rating (TPR) source 256, the aggregate page rank (AP) source 258, the word count (WC) source 260, and the letter count (LC) source 270 are considerations used in the determination of the Gross Competitive Score. In one embodiment, other sources of information, in addition to the cost per click (CPC) source 250, the Click-Thru rate (CTR) source 252, the search volume (SV) source 254, the third party rating (TPR) source 256, the aggregate page rank (AP) source 258, the word count (WC) source 260, and the letter count (LC) source 270, are used to determine the Gross Competitive Score. In one embodiment, the sources used as considerations in the determination of the Gross Competitive Score may be managed or maintained by entities different from those managing the system 100 or components thereof.

The CPC source 250 provides a score value indicative of bid value of a search term. The higher the bid is for a search term, the more competitive the search term is. For example, a search term "credit card offers" may sell for several dollars while a search term "George Washington" may sell for a nickel. Thus, the former search term is very competitive and is associated with a high score value, whereas the latter search term is less competitive and is thus associated with a low score value.

The CTR source 252 provides a competitive score correlating to the click-thru rates of a search term. How frequently people click on the advertisements associated with a search term correlates to how competitive the search term is since people generally build competitive content for terms with high Click-Thru rates. For example, a search term "best credit card deals" has a high Click-Thru rate, whereas a search term "how to boil an egg" has a low Click-Thru rate. Therefore, the former search term is associated with a score value that is higher than the latter search term.

The SV source 254 provides a score value indicative of the volume of searching associated with a search term. For any given search term, there are a certain number of people who type that search term into search engines in any given time period (e.g., a month). For example, many searches would be performed on a famous celebrity personality, whereas fewer searches would be performed on a search term "left handed dentist tools". Many search terms would be associated with search volumes between those exemplary extremes. When assigning a score value, search terms associated with a large number of searches are more competitive because more content is created around these terms. Similarly, search terms associated with a small number of searches are not actually more competitive but behave as if they were because there are very few people who search for the search term. Therefore, search terms associated with either a very large or very small number of searches are given high score values whereas terms in the middle are given lower score values.

The AP source 258 provides a score value indicative of the ranking of websites that are returned as matches in response to a search associated with a search term. Website rankings, which determine the number of visitors to the website in a given period of time, are provided by various companies. One exemplary website ranking is provided by Evrsoft Developer Network, which provides an Alexa Ranking Tool, which can be located at http://developers.evrsoft.com/find-traffic-rank.shtml. For example, when a search term is entered into a search engine, a certain number of search matches are returned. The top ten of the search matches are identified, and website rankings of the websites associated with the top ten search matches are determined. A search term that returns matching websites that are highly ranked is more competitive than a search term that returns matching websites that are lowly ranked.

The TPR source 256 provides a score value indicative of page ranking. In a manner similar to the manner described above in connection with the TRP source 256, the page rank of each of the top ten matches returned in response to a term search is determined. Then, the page ranks are squared and summed together as the score value. The higher the score value, the more competitive the search result set is.

The WC source 260 provides a score value indicative of the number of words in a search term. For example, search terms with one or two words—e.g., "dogs" or "dog breeds"—are more competitive than search terms with more than two words—e.g., "dog breeds that are good with children". Thus, the score value of search terms having fewer words is higher than the score value of search terms having more words.

The LC source 262 provides a score value indicative of the number of letters in a search term. For example, short words are more competitive than long words, and thus the score value for a short word is higher than the score value for a long word.

The CCM source 264 provides a score relative to the competitiveness of the overall category in which the term would fall. Words are categorized using any popularly-developed taxonomy or mode of taxonomy then rated for competitiveness based on their overall competitive rate. For example, "money and finance" is a more competitive category than "history."

Each score value for the cost per click (CPC) source 250, the Click-Thru rate (CTR) source 252, the search volume (SV) source 254, the third party rating (TPR) source 256, the aggregate page rank (AP) source 258, the word count (WC) source 260, the letter count (LC) source 262 and Category Competitiveness Measure (CCM) source 264 are added together to generate the Gross Competitive Score.

The routine 200 proceeds to block 206. At block 206, the Percentile Competitive Score is determined. To determine the Percentile Competitive Score, each Gross Competitive Score for the set of search terms of interest are then converted to have a percentile rank so that there are an equal number of search terms in each of the 100 percentiles. That is, the number of search terms in the $99^{th}$ percentile is equal to the number of search terms in the $98^{th}$ percentile, which is equal to the number of search terms in the $97^{th}$ percentile, etc.

The routine 200 proceeds to block 208, where the Percentile Competitive Score is converted to the Traffic Estimate (TE) provided by the competitive ability module 110. The Percentile Competitive Score is mapped to a table corresponding with a traffic prediction of that percentile. For example, a particular keyword in the $99^{th}$ percentile is associated with 3456 views a month. As another example, another keyword in the $98^{th}$ percentile is associated with 2999 views a month. Therefore, content built around that keyword is predicted to receive that many views per month.

Figure 3:
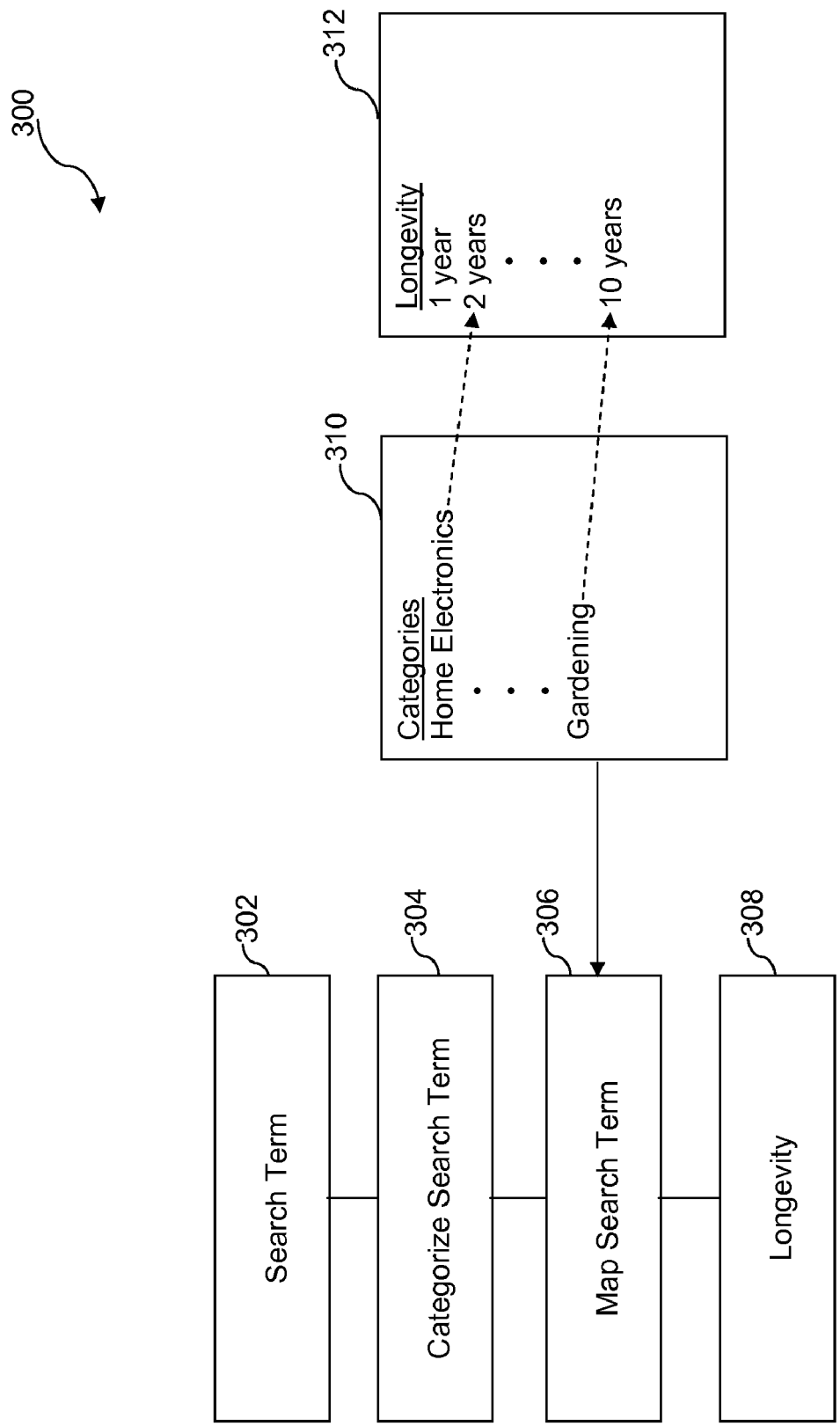
FIG. 3 illustrates a method for determining an indication of profitability of a search term in accordance with one embodiment of the present invention.

The longevity module 112 provides a value indicating the longevity associated with content built around a particular search term (Longevity Value) LV. The longevity module 112 performs a mapping, based on expert analysis, between categories of search terms and durations of time. FIG. 3 illustrates a method 300 for determining the Longevity Value LV. The method 300 begins at block 302 where the search term of interest is identified. The method 300 proceeds to block 304. At block 304, the search term is categorized. For example, the search term "shovel" falls under the category "gardening". As another example, the search term "DVD player" falls under the category "home electronics". The method 300 proceeds to block 306, where a mapping is performed to associate the category with a value of longevity. A category listing 310 of categories includes, for example, "home electronics" and "gardening". The category listing 310 can include other categories encompassing other search terms. A longevity listing 312 includes a sequence of time durations. The category "gardening" is associated with a longevity of 10 years. The category "home electronics" is associated with a longevity of two years. The method 300 proceeds to block 308, where the Longevity Value LV is determined from the longevity listing 312. The Longevity Value LV is provided to the computing device 102.

Figure 4:
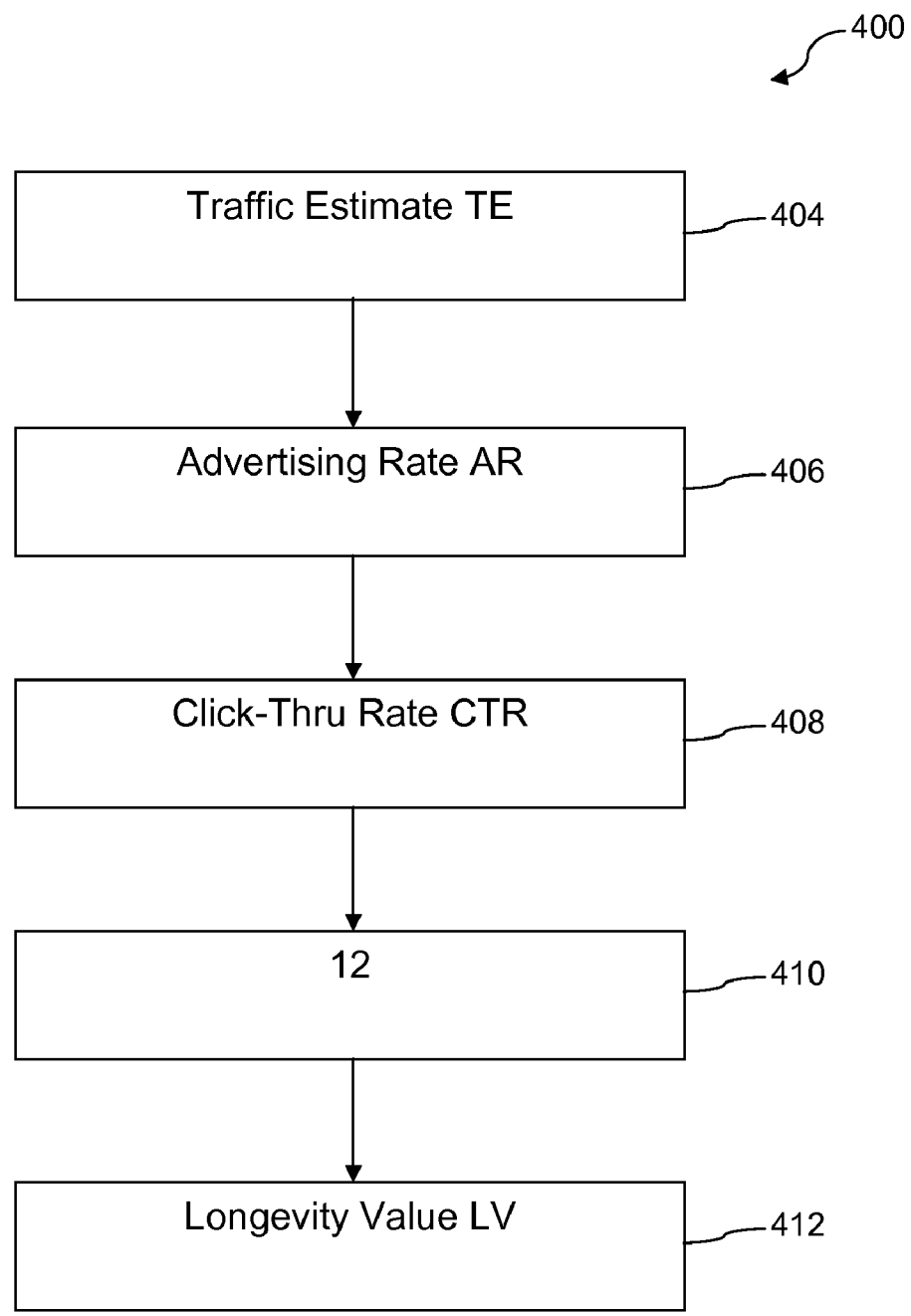
FIG. 4 illustrates a method for determining longevity of a search term in accordance with one embodiment of the present invention.

FIG. 4 illustrates a routine 400 for determining a Ranking Value RV for a particular search term. The routine 400 begins at block 404, with the Traffic Estimate (TE). The routine 400 proceeds to block 406, where the amount of block 404 is multiplied by the Advertising Rate AR. The routine 400 proceeds to block 408, where the Traffic Estimate (TE) is multiplied by the click-thru Rate CTR. The routine 400 proceeds to block 410, where the result of block 408 is multiplied by twelve (12). The routine 400 proceeds to block 412, where the result of block 410 is multiplied by the Longevity Value LV.

The routine 400 represents the determination of a Ranking Value RV, where:

$$RV = TE \times AR \times CTR \times 12 \times LV$$

The Ranking Value is a quantitative indication regarding the revenue forecast of content developed around this profitability of a particular search term. In one embodiment, the determination of the Ranking Value RV may be modified with weighting factors to render more or less important the various values used in the determination. Considerations such as reusability of the content, strategic value, and the ability of the content to create inbound links are some of the factors which could contribute to weighting current factors.

An embodiment of the invention relates to a computer storage product with a computer-readable or machine-accessible medium having executable instructions or computer code thereon for performing various computer-implemented operations. The term "computer-readable medium" or "machine-accessible medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts.

Examples of computer-readable media include computer-readable storage media such as: magnetic media such as hard disks, floppy disks, and magnetic tape; optical media such as Compact Disc-Read Only Memories ("CD-ROMs") and holographic devices; magneto-optical media such as optical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hard wired circuitry in place of, or in combination with, computer code.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations is not a limitation of the invention.

What is claimed is:

1. A tangible machine-readable medium having stored thereon a set of instructions, which when executed on a computing device, cause the computing device to perform a method comprising:
   receiving, over a network, information regarding word phrases;
   determining, via a physical computing device, longevity values associated with content built around the word phrases;
   selecting, based on the longevity values, a first phrase from the word phrases;
   building first content around the first phrase; and
   presenting the first content over a network.

2. The machine-readable medium of claim 1, wherein the method further comprises determining advertising rates associated with the word phrases, and the selecting the first phrase is further based on the advertising rates.

3. The machine-readable medium of claim 1, wherein each of the word phrases is a search term, and the network is the Internet.

4. The machine-readable medium of claim 1, wherein the determining longevity values comprises categorizing each of the word phrases, and mapping a category for each word phrase to a respective longevity value.

5. A computer implemented method for ranking a search term by profitability comprising:
   receiving, via a physical computing device, information regarding a total number of people who are searching the search term;
   determining a traffic estimate of the search term; and
   determining longevity of the search term.

6. The method of claim 5, further comprising receiving information regarding an amount advertisers pay for the search term, and receiving information regarding a click-thru rate of the search term.

7. The method of claim 5, wherein the determining a traffic estimate of the search term includes determining a frequency of views of content for the search term.

8. The method of claim 5, wherein the determining a traffic estimate of the search term includes determining a gross competitive score.

9. The method of claim 8, wherein the determining the gross competitive score is based on a click-thru rate and a word count.

10. The method of claim 5, further comprising validating at least one of the total number of people who are searching on the search term and the amount advertisers pay for the search term.

11. The method of claim 5, further comprising receiving information regarding an amount advertisers pay for the search term.

12. The method of claim 5, further comprising building content around the search term, and presenting the content over the Internet.

13. The method of claim 5, wherein the determining the traffic estimate of the search term includes determining a percentile competitive score.

14. The method of claim 5, further comprising determining a gross competitive score based on a cost per click and a letter count.

15. A system for determining profitability of a word phrase, the system comprising:
   at least one physical computing device coupled to external database sources;
   a competitive ability module, coupled to the sources, to determine a traffic estimate of the word phrase; and a longevity module, coupled to the sources, to determine the longevity of the word phrase.

16. The system of claim 15, wherein the sources include an advertising rate source having information regarding an amount advertisers pay for the word phrase.

17. The system of claim 16, wherein the at least one computing device computes a ranking value for the word phrase based on outputs from the advertising rate source, a click-thru rate source, the competitive ability module, and the longevity module.

18. The system of claim 15, wherein the at least one computing device determines a longevity value associated with content built around the word phrase, and publishes content built around the word phrase over the Internet.

19. The system of claim 18, wherein the at least one computing device further determines an advertising rate associated with the word phrase.

20. The system of claim 18, wherein the longevity value is determined by categorizing the word phrase, and mapping a category for the word phrase to the longevity value.

\* \* \* \* \*